R. M. ODELL.
EGG CARTON.
APPLICATION FILED JAN. 14, 1920.

1,397,539.

Patented Nov. 22, 1921.

3 SHEETS—SHEET 1.

WITNESSES

INVENTOR
Risdon Moore Odell
BY
ATTORNEYS

R. M. ODELL.
EGG CARTON.
APPLICATION FILED JAN. 14, 1920.

1,397,539.

Patented Nov. 22, 1921.
3 SHEETS—SHEET 2.

WITNESSES

INVENTOR
Risdon Moore Odell.
BY
ATTORNEYS

Risdon Moore Odell, INVENTOR

UNITED STATES PATENT OFFICE.

RISDON MOORE ODELL, OF DECATUR, ILLINOIS.

EGG-CARTON.

1,397,539.  Specification of Letters Patent.  Patented Nov. 22, 1921.

Application filed January 14, 1920. Serial No. 351,376.

*To all whom it may concern:*

Be it known that I, RISDON MOORE ODELL, a citizen of the United States, and a resident of Decatur, in the county of Macon and State of Illinois, have invented certain new and useful Improvements in Egg-Cartons, of which the following is a specification.

My present invention relates generally to the transportation of eggs in the usual egg case in fillers, as well as in cartons, holding one dozen or more of eggs, and in cartons for parcel post service and more particularly to devices for safely packing or packaging eggs, my objects among others being the provision of a device by means of which eggs may be shipped without danger of breakage in separated, cup-shaped cells or pockets, and which when disposed within a cover and the like forming the carton proper will act as a brace to prevent collapsing.

A further object of my invention is to provide a device in which air, light, moisture, odors, heat and cold may be excluded from the packaged eggs whereby to do away with the necessity of placing them in cold storage or otherwise to prevent spoiling.

A still further object is the provision of an egg receptacle of this nature which will prevent leaking eggs from soiling other eggs in adjacent cells or pockets.

A still further object of the invention is the provision of an egg case filler capable of subdivision to form the upper and lower portions of an egg holding tray for egg transporting cartons.

A still further object is the provision of a carton which is both simple in construction and light in weight, together with a shock absorbing insert in connection with the egg tray of the carton, and an air cushion holding jacket, these several parts when properly assembled, providing for safe, convenient use through the mails.

Figure 1:
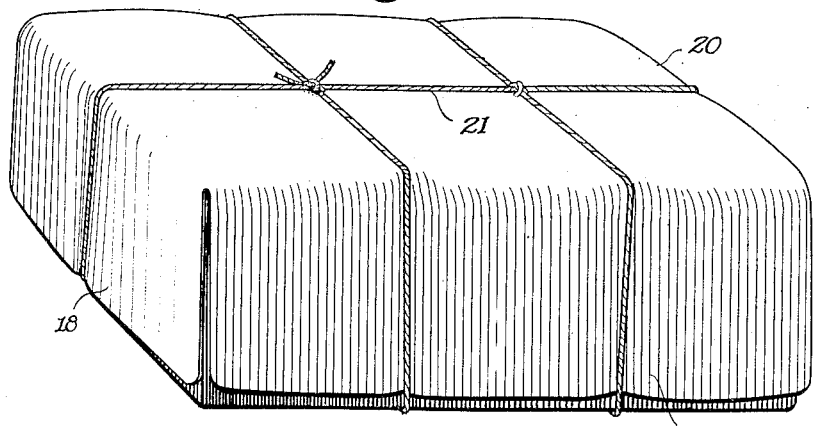

In the accompanying drawings which illustrate my present invention and form a part of this specification, Figure 1 is a perspective view of the carton complete and ready for mailing.

Figure 2:
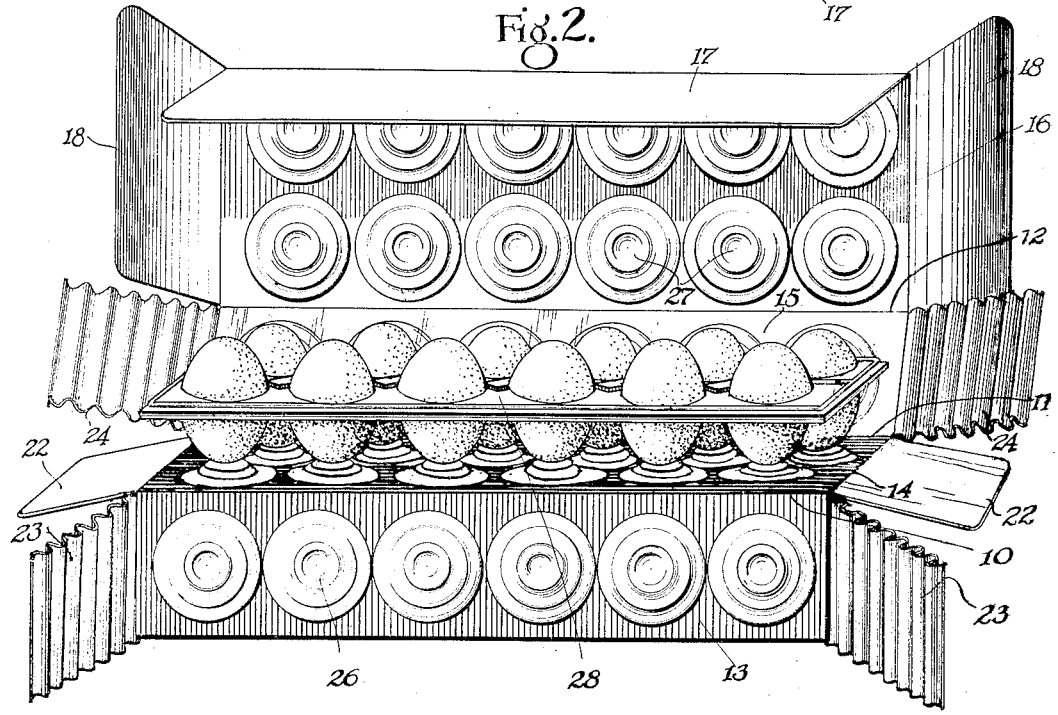
Figure 3:
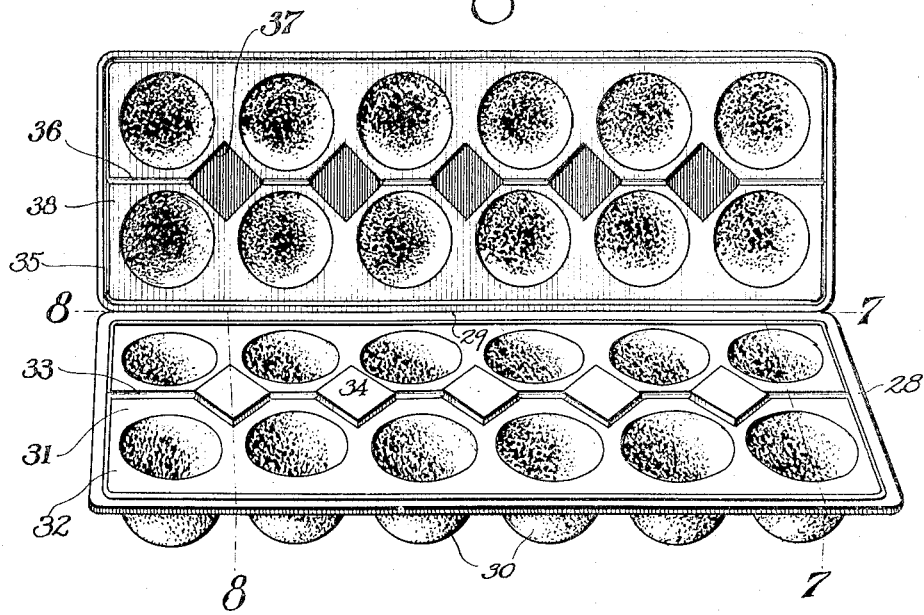
Figure 7:
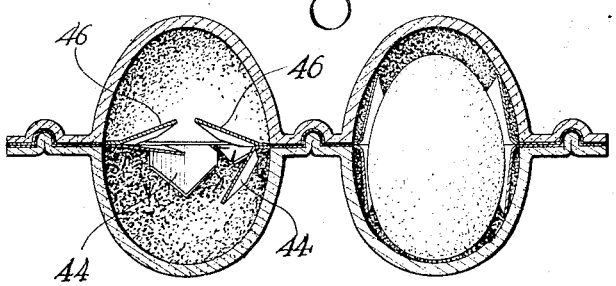
Figure 8:
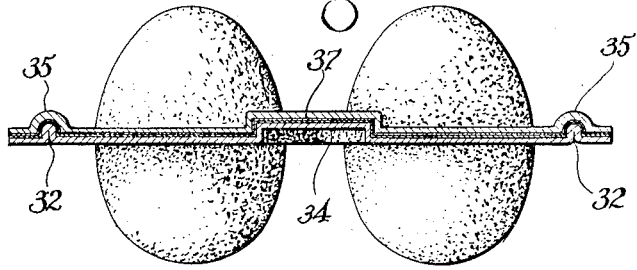
Figure 4:
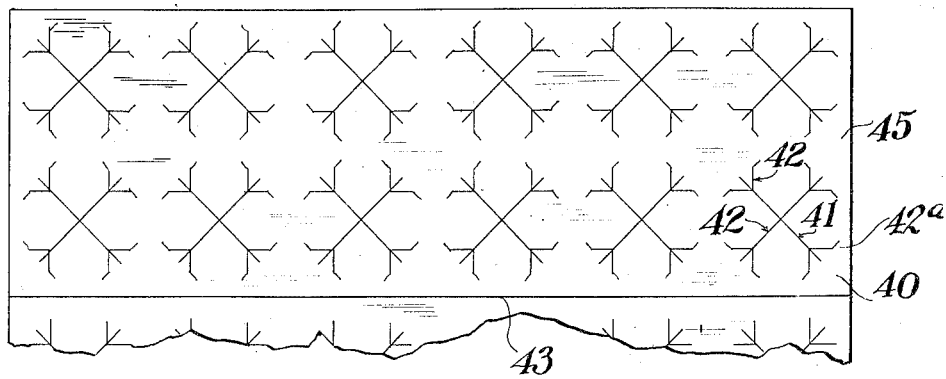
Figure 5:
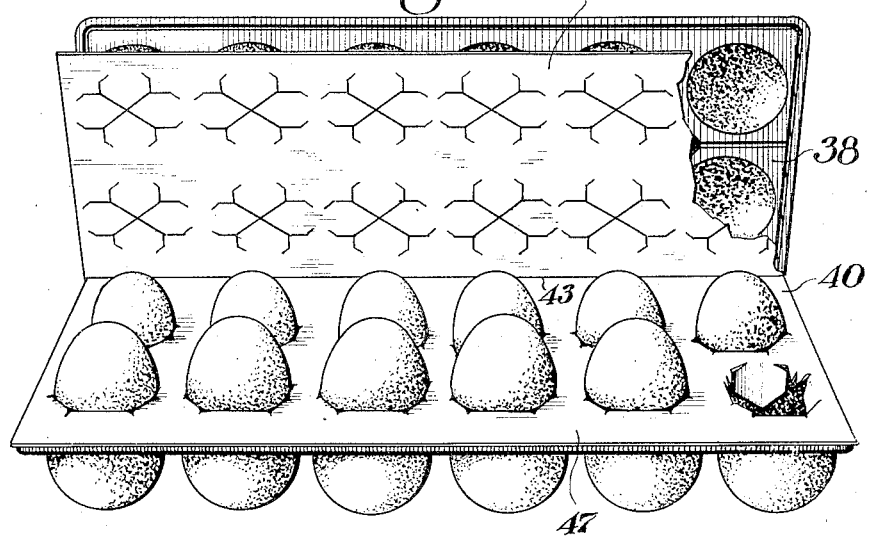
Figure 6:
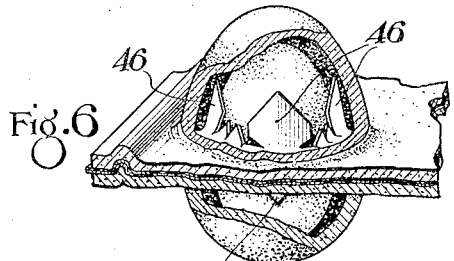

Fig. 2 is a perspective view with the jacket open, showing the egg holding tray complete within the jacket, Fig. 3 is a perspective view showing the egg tray partly folded, Fig. 4 is a plan view of a portion of the shock absorbing insert, Fig. 5 is a perspective view of the tray partly folded with the shock absorber insert in place, Fig. 6 is a fragmentary perspective view showing an egg in place in one of the cells or pockets of the egg tray with the shock absorbing insert, Fig. 7 is a transverse section through the egg tray completely folded, taken on the imaginary line 7—7 of Fig. 3, and Fig. 8 is a similar view taken on the imaginary line 8—8 of Fig. 3.

Referring now to these figures, the carton as proposed by my present improvements includes a jacket formed from a single rectangular section of material provided with lengthwise scored lines 10, 11 and 12 between the front side 13, base 14, rear side 15 and top 16, the latter having a front flap 17 and outside end flaps 18, each with an outer smooth surface as particularly seen in Fig. 1, so that the complete carton generally indicated at 20 in Fig. 1, when tied by a cord 21 presents a neat smooth and pleasing appearance.

The base 14 has inner end flaps 22 as seen in Fig. 2, and the end flaps 23 and 24 of the front and rear sides 13 and 15 are preferably corrugated as illustrated which effectively protects the ends of the complete carton in coöperation with the inner and outer end flaps 18 and 22 of the top 16 and base 14.

The front side 13 and rear side 15 are each provided with a lengthwise series of attached inwardly projecting air cushion members 26 and the top 16 and base 14 each have rows of similar air cushion members 27 spaced to coincide with the positions of the egg holding cells or pockets of the egg holding tray generally indicated at 28 and seen in place within the partly folded carton in Fig. 2.

As thus described, my invention proposes a carton for the transportation of eggs, for instance through the mails and in the other figures and the description to follow, I will go more or less into detail concerning the particular construction of the egg holding tray 28, in so far as my invention applies thereto.

Referring to the egg tray, as illustrated particularly in Figs. 3, 6, 7 and 8, my invention contemplates a filler plate made in any suitable size with any desired number of egg holding pockets or cells, so long as these cells are in parallel rows, the reason for which will presently appear.

The filler plate is preferably provided with a scoring line 28 between each two rows of cells, the latter of which are formed by pressing paper pulp of which the plate is preferably constructed in order to provide half cells 30 which when opposed as in Figs. 7 and 8 in particular, after bending or folding on the scoring line 29, come together in order to receive the eggs.

One section 31 of each tray is provided with an embossed rib 32, extending around its two rows of half pockets or cells 30 and joining at the sides with a lengthwise similarly constructed rib 33 which extends between its rows of half cells and between pairs of half cells therein. The central rib 33 may be provided with embossed squares and the like, 34, the ribs 32 and 33 and the squares 34 entering the corresponding surrounding groove 35 lengthwise groove 36 and square recesses 37 of the other section 38, so that when the section 38 is folded on the section 31, inter-engagement of the ribs and recesses will effectively prevent communication of the several egg cells or pockets with the atmosphere. Inter-engagement of the lengthwise ribs 33 and recesses 36 prevents communication between the rows of eggs and the engagement of the embossed squares 34 in the recesses 37 lends stability to the entire structure and in this latter function, it is obvious that the ribs and recesses will co-operate.

The pockets or cells are of course made of greater size than normal size eggs in order to receive large as well as small eggs, and I preferably utilize in the tray so formed a shock absorbing insert, whose nature permits of effective holding of the eggs in such manner as to prevent their wabbling or rolling in the pockets or cells and the communication of breaking shocks and crushing strains.

This insert is seen at 40, in Fig. 4, and is provided at certain localized points with crossing slits 41 and the ends of which slits have supplemental radiating slits 42 certain of the latter of which have angular extension slits 42ª, forming between them freely flexible egg engaging tongues. This structure is such as to produce the desired result in so far as the egg engaging and holding tongues are concerned with minimum weakening of the shock absorbing insert as a whole and minimum danger of breaking of the tongues formed by the bending of those portions lying between the slits out of the plane of the insert.

The insert may be formed from light cardboard or similar material and is preferably provided with a scored line 43, so that two portions thereof will be superposed by bending along the said line 43 when the two sections of the tray are folded one on the other.

In use the insert 40 is placed on the filler plate before the latter is folded to form the tray, and before folding and with the slitted portions of the insert above the half pockets at one side of the filler plate the eggs are forced at one end downwardly into these egg pockets through the insert, pressing tongues 44 downwardly between the slits as indicated in Figs. 6 and 7.

Thus with the eggs in the position described and as shown in Fig. 5, folding of the section 38 of the tray onto the section 31 carries with it the section 45 of the insert at one side of its scored line 43. The upper portions of the eggs will during this movement be pressed upwardly through section 45 of the insert into the half pockets of the tray section 38 so that the tongues 46 between the slits of the insert section 45 will be pressed upwardly as seen in Figs. 6, and 7, to engage the eggs above their centers in the same manner that the eggs are engaged below their centers by the tongues 44 previously described.

The sections 44 and 47 of the insert 40 are thus brought into superposed relation between the supplemental sections of the egg tray and the material of which the insert is formed is preferably such as to permit of its bending into and between the embossed ribs and grooves of the tray sections previously described, as well as the embossed squares and recesses thereof, as seen by a comparison of Figs. 7 and 8.

Experiments have shown that with egg preservation in mind, it is an important consideration that light, air, moisture, odors, heat and cold be excluded from the eggs and it has been found that by doing this much of the present necessity of cold storing of eggs can be avoided. With my improved construction, it is obvious the eggs will be entirely isolated in their several cells not only for the purpose of the foregoing, but also to effectively prevent leakage from one cell to another when an egg becomes broken through excessively rough handling of the carton.

It is also obvious that by virtue of its rectangular shape and the fact that its surrounding edge projects beyond the limits of its outermost egg pockets or cells, together with the further fact that this surrounding edge portion of the tray carries relatively engaging ribs and grooves capable of imparting added strength to the tray in addition to their air excluding functions, the tray when inclosed in the wrapper will constitute a brace for the entire carton so as to avoid danger of collapse and at the same time permit the carton as a whole to be readily and quickly assembled as will be seen.

I claim:—

1. An egg holding tray having folded portions provided with means forming egg receiving pockets or cells arranged in rows and also provided with relatively engaging ribs and grooves around the pockets, adjacent to its edge and between the rows of pockets or cells and with embossed projections and recesses at spaced points along the ribs and grooves between the said rows.

2. An egg holding tray having folded portions provided with means forming egg receiving pockets or cells arranged in rows and also provided with relatively engaging ribs and grooves around the pockets, adjacent to its edge and between the rows of pockets or cells, said tray sections also having relatively engaging embossed squares and recesses.

3. An egg tray including folded sections, each provided with half pockets or cells adapted to inclose eggs, and a shock absorbing insert consisting of sections between and foldable with the sections of the tray, the said sections of the insert having crossed slits opposite the said pockets and angular slits diverging from the opposite ends of said crossed slits through which eggs are oppositely pressed to form freely yieldable egg engaging tongues of maximum size projecting in relatively opposite directions.

RISDON MOORE ODELL.